United States Patent [19]
Nozawa et al.

[11] 3,795,337
[45] Mar. 5, 1974

[54] SAFETY CAP

[75] Inventors: Takamitsu Nozawa; Takaharu Tasaki; Kazuo Nishiiue, all of Tokyo, Japan

[73] Assignee: Yoshino Kogyosho Co., Ltd., Tokyo, Japan

[22] Filed: July 5, 1972

[21] Appl. No.: 269,238

[30] Foreign Application Priority Data
July 14, 1971 Japan ........................... 46-61940
Nov. 4, 1971 Japan ........................... 46-102607

[52] U.S. Cl. ................................................. 215/9
[51] Int. Cl. ............................................ B65d 55/02
[58] Field of Search ........................................ 215/9

[56] References Cited
UNITED STATES PATENTS
2,964,207 12/1960 Towns .................................... 215/9
3,394,829 7/1968 Peterson ................................ 215/9
3,722,727 3/1973 Gach ..................................... 215/9

Primary Examiner—Donald F. Norton
Attorney, Agent, or Firm—Fidelman, Wolffe, Leitner & Hiney

[57] ABSTRACT

A safety cap according to the present invention comprises an outer cap of a synthetic resin and an inner cap vertically movably and rotatably inserted into said outer cap. Between said inner and outer caps there are provided resilient engaging pieces, projections and engaging projecting members, by action of which usually the inner cap can be turned by turning only the outer cap in a tightening direction while the inner cap can not be turned, relative to the untightening direction, unless the outer cap is turned in such a state that the outer cap is pushed down, that is, the outer cap running idle.

3 Claims, 15 Drawing Figures

PATENTED MAR 5 1974 3,795,337

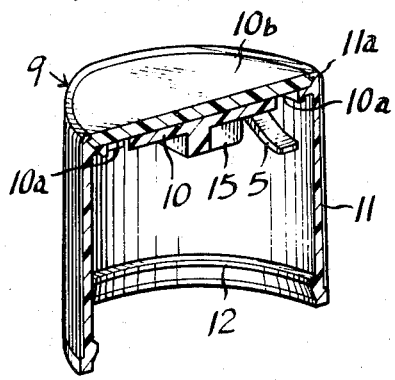
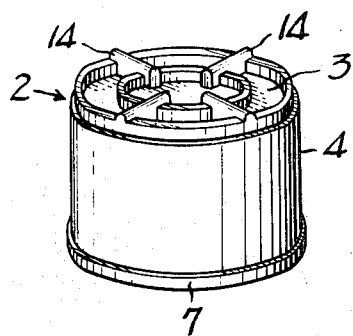
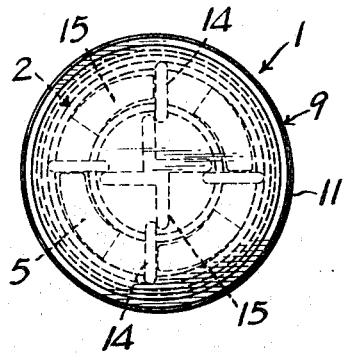
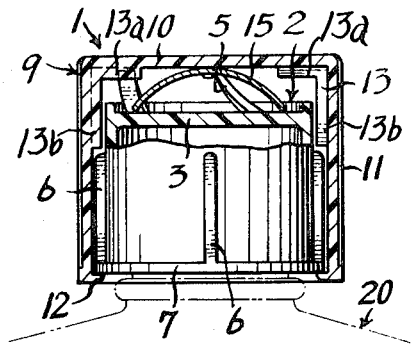
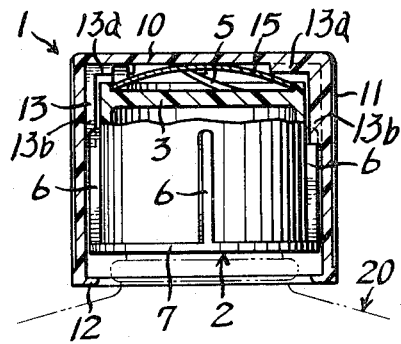

SAFETY CAP

The present invention relates to a safety cap.

Among many containers for a house use, there are no small number of contents injurious to health. Therefore, these containers containing injurious contents are stored in a place not accessible to children, but this measure is not sufficient in view of prevention of danger. Children may erroneously take injurious matter causing them to death.

The present invention is applied to containers containing injurious matters as above described, thereby children can not open a cap of container.

Various constructions of a safety cap have heretofore been known. Conventionally, engaging concave and convex portions are provided in the outer surface of neck portion of a container and in the inner surface of surrounding wall of a cap, respectively, or a resilient cylindrical portion, which widens open diagonally and downwards, is provided from the rear surface of top wall of the cap.

The cap is placed to cover the neck portion of the container and the lower end of said resilient cylindrical portion is made in contact with the upper surface of the container, and the cap is pushed down against the resilient force of the resilient cylindrical portion and in a state being pushed down the cap is slightly turned to thereby engage said concave portion with said convex portion. In the conditions that the cap is secured in the foregoing manner, a lip portion of the container is sealed by said resilient cylindrical portion. The cap can be removed by pushing down the cap and then by slightly turning it in that state, and therefore children are not aware of such an operation necessary for removing a cap, thus being impossible to remove the cap.

However, such a safety cap heretofore available if it is formed by a synthetic resin material, had difficulty when a safety cap thus formed is taken out from a mold. Due to the difficulty as described above in formation, it is hard to form said resilient cylindrical portion having a good performance. On the other hand, since the safety cap of this type is not of threaded type relative to the neck portion of the container, the seal of container is apt to make incomplete if said resilient cylindrical portion is made insufficiently. Further, said resilient cylindrical portion has a drawback to produce a resilient fatigue.

A safety cap according to the present invention comprises a double cap consisting of an inner and outer caps of a synthetic material. Said inner cap is made vertically movable within the outer cap and rotatably fitted therein.

The inner surface of surrounding wall of the inner cap is threaded so as to mesh with the thread of outer surface of neck portion of the container.

Resilient engaging pieces, projections, and engaging projecting members are provided between said inner and outer caps, that is, between top walls and surrounding walls of each cap. According to the safety cap of the invention, by action of the above provisions, usually the inner cap may be turned by turning only the outer cap in a tightening direction while the inner cap may not be turned, relative to the untightening direction, unless the outer cap is turned in such a state that the outer cap is pushed down, that is, when the outer cap is turned in an untightening direction in a usual manner, only the outer cap runs idle so that unscrewing the inner cap in a tightened state can not be made.

An object of the present invention is to provide a safety cap which always secures a firm sealing of container by the provision of a thread type safety cap.

Another object of the invention is to provide resilient elements which are hard to produce resilient fatigue, within a safety cap.

Further object of the invention is to provide resilient engaging pieces, that is said resilient elements, which can be easily formed in the integral formation of said inner and outer caps of a synthetic resin material.

Further still object of the invention is provide inner and outer caps both of which are able to rotate, when necessary, and or only the outer cap of which is able to rotate.

In the drawings:

FIGS. 10 and 11 are disassembled views of a safety cap in the fifth embodiment, FIG. 10 being an isometric view of the outer cap partly broken and FIG. 11 being an isometric view of the inner cap;

FIG. 12 is a plan view of a safety cap in the fifth embodiment; and

FIGS. 13a and 13b shows a safety cap in the sixth embodiment, FIG. 13a being a longitudinal section in which outer cap is not pushed down while FIG. 13b a longitudinal section in which outer cap is pushed down.

Figure 1:
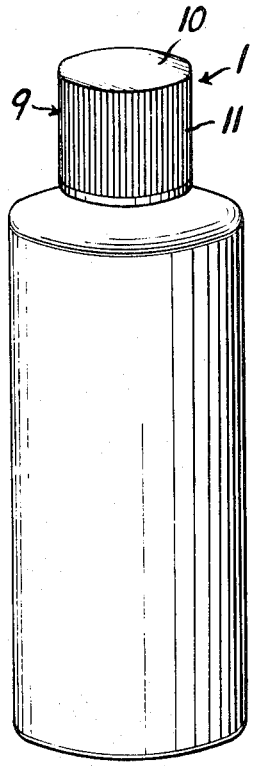
FIG. 1 is an isometric view of a container in which the cap according to the present invention is embodied.

Referring to the drawings, the first embodiment of a safety cap according to the present invention will now be described with reference to FIG. 1 to FIG. 5.

The safety cap 1 of the invention comprises an inner cap 2 and an outer cap 9. The inner cap 2 comprises a disc-like top wall 3, from the peripheral edge of which a cylindrical peripheral wall 4 is vertically provided. A plurality of resilient engaging pieces 5 are projected with their utmost ends formed as free ends in the same diagonal direction upwards from the pripheral part of the top wall 3, and the first engaging projecting members 6 are provided in a suitable spaced relation on the outer surface of said peripheral wall 4 directed downwards from the intermediary portion of peripheral portion. A projection 7 mounted on the outer edge at the lower portion of said peripheral wall serves to be a reinforcing rib. A thread 8 (see FIG. 8) is provided on the inner surface of said peripheral wall to mesh with a thread 22 provided in a neck portion of container 20.

Figure 2:
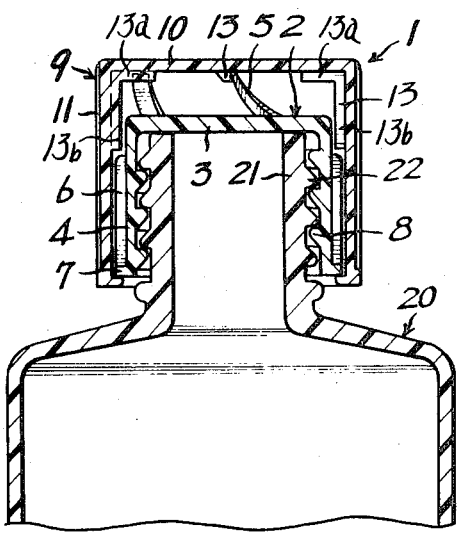
FIG. 2 is a longitudinal section of the same.
Figure 3:
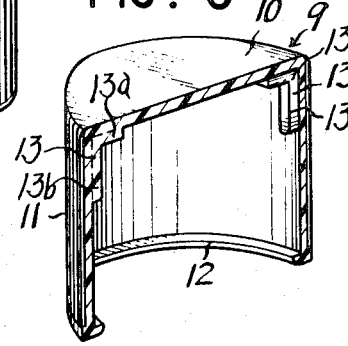
FIG. 3 is an isometric view of an outer cap partly broken.
Figure 4:
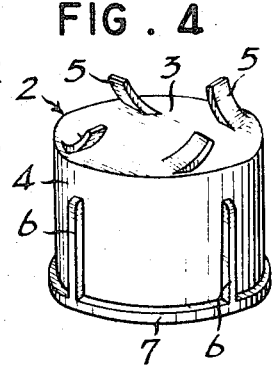
FIG. 4 is an isometric view of an inner cap.
Figure 5A:
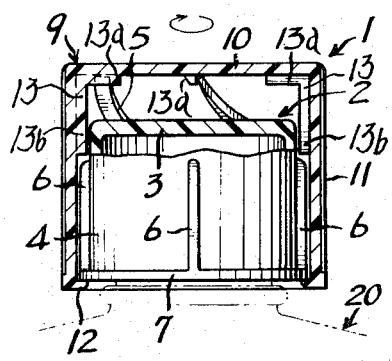
FIG. 5a is a longitudinal section showing transmission of turning force with respect to the inner can when the outer cap is turned in a tighening direction.
Figure 5B:
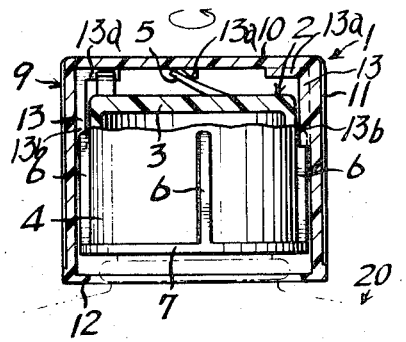
FIG. 5b is a longitudinal section showing a resilient engaging piece when the outer cap is turned in an untighening direction.

A cylindrical peripheral wall 11 is vertically provided from the peripheral portion of a disc-like top wall 10 of the outer cap 9. Said inner cap 2 is possible to be inserted into the outer cap 9, and a rib 12 mounted on the inner edge at the lower end of the peripheral wall 11 is made in contact with the lower edge of the projection 7 so that the inner cap can not be disengaged from the outer cap. A plurality of projections 13 are provided from the peripheral portion of inner surface of the top wall 10 of the outer cap to the intermediary portion of the peripheral wall 11. The back part 13a of the top wall 10 of said projection 13 is to mesh with said resilient engaging pieces 5, and the inner surface part of the peripheral wall 11 is the second engaging projection 13b for meshing wtih the first engaging projection 6. As shown in FIG. 2, in the conditions that inner and outer caps are fitted, a given space is formed between top walls 3 and 10 of said inner and outer caps, and the upper end of the first engaging projections 6 is located below the lower end of the second engaging projection 13b. In this condition, when the safety cap 1 is made in contact with the neck portion of container and turned to the cap tightening direction, the utmost end of the resilient engaging pieces 5 contacts, as shown in FIG. 5a, with the back part 13a of the top wall of projection 13 of the outer cap 9, and therefore, when the outer cap 9 is kept to be turned, the turning force applied to the outer cap 9 is transmitted to the inner cap 2 through the projections 13 and resilient engaging pieces 5 so that the thread 8 of inner cap 2 is threaded with the thread 22 of the neck portion of the container. Moreover, the projection part 13a is provided with two faces, one of which is a vertical face and the other is a tapered face, as shown in FIGS. 2, 5a and 5b. An engaging face between the projection part 13a and a free end of the resilient engaging piece 5 is made to have a vertical face, the opposite face of which is made a tapered face, so that a smooth changeover may be attained between the turning force and idling caused by the outer and inner caps.

In this way, the safety cap 1 firmly tightened pushes the outer cap 9 down against the resilient force of the resilient engaging pieces 5, and the outer cap can not be disengaged from the neck portion 21 of the container unless it is turned in an untightening direction with it being pushed down. Since children are usually not aware of this method of removing a safety cap, they can not open it. As shown in FIG. 5b, push down the outer cap 9 and turn it to the untightening direction in maintenance of the pushing-down force.

Then, the second engaging projection part 13b of the projections 13 is meshed with the first engaging projection 6 so as to turn the inner cap 2 in an untightening direction. In this way, the thread 8 is disengaged from the thread 22. Further, the resilient engaging piece 5 is pushed down as shown in FIG. 5b due to its resilience when the outer cap is pushed down, and pushes up again the outer cap 9 as shown in FIG. 5a when the outer cap is released.

Figure 6:
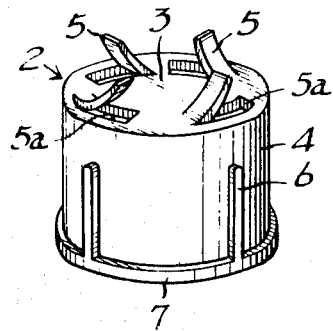
FIG. 6 is an isometric view of the inner cap in the second embodiment.
Figure 7:
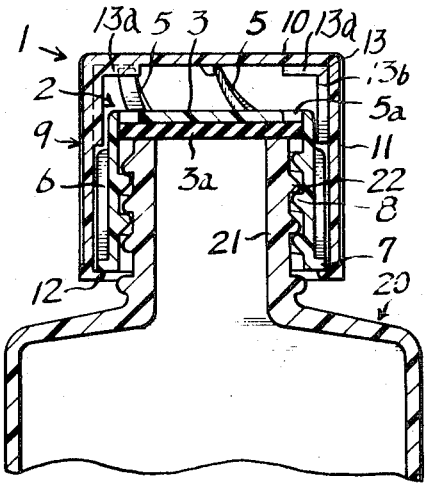
FIG. 7 is a longitudinal section of the safety cap provided with an inner cap embodied in the container.

The inner cap 2 and outer cap 9 are integrally formed of a synthetic material. However, the integral formation of the inner cap in such a shape that the resilient engaging piece 5 is projected from the top wall of the inner cap 2 often becomes complicated in the construction of cap forming mold. The second embodiment as shown in FIGS. 6 and 7 show a simple way of said formation as described just above. That is, there is provided with a hole 5a in the top wall at the lower part of resilient engaging pieces 5 in order to pull out a metal mold. In the event that the hole 5a is provided in the inner cap, the hole 5a can be blocked by fitting a packing 3a in the inner surface of the top wall 3 of the inner cap.

Figure 8:
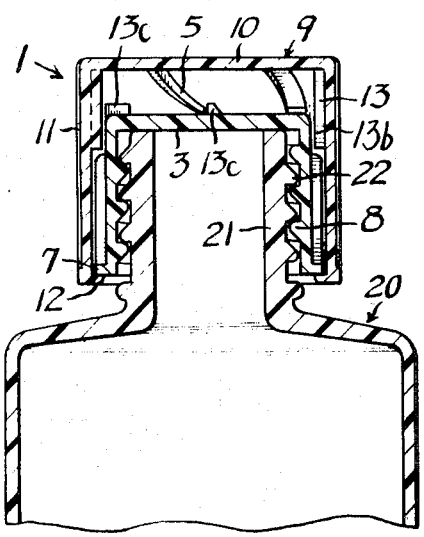
FIG. 8 is a longitudinal section of the container in which the cap is embodied in the third embodiment.

In the foregoing first and second embodiments, the resilient engaging pieces 5 are projected from the side of top wall 3 of the inner cap. On the other hand, according to the third embodiment as shown in FIG. 8, which shows an embodiment, in which resilient engaging pieces 5 are projected from the inner surface of the top wall 10 of the outer cap 9 and the projection 13c is mounted on the upper surface of the top wall 3 of the inner cap. In this instance, since the back face portion 13a of the top wall of the projection 13 as shown in FIG. 2 is not necessary, such is not provided in FIG. 8.

Figure 9:
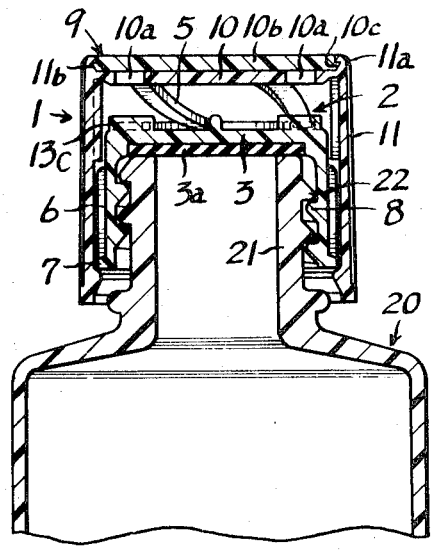
FIG. 9 is longitudinal section of the container in which the cap is embodied in the fourth embodiment.

According to the fourth embodiment as shown in FIG. 9, there is provided with hole 10a in the top wall at the upper part of resilient engaging pieces 5 so that a metal mold can be taken out. In this instance, a top wall covering plate 10b may well be provided over the top wall 10. In the embodiment in FIG. 9, the upper part of the peripheral wall 11 is slightly extended 11a upwards, and the peripheral part 10c of the top wall covering plate 10b is fitted in the groove 11b of the inner surface of the said extended part.

In the foregoing embodiments from first to fourth, the first engaging part 6 and the second engaging part 13b as part of projection 13 to be meshed therewith are mounted between the peripheral walls 4 and 11 of the inner and outer caps. As shown in FIG. 10 to FIG. 12 by way of the fifth embodiment, it is possible to provide such members as above between the top walls 3 and 10 of the inner and outer caps. In this case, the first engaging projections 14 are radially formed on the upper surface of the top wall 3 for the inner cap 2 except the central portion thereof, and the second engaging projection 15 of a cross shape with the cross portion moved is formed at the rear surface of the outer cap 9. These engaging projections 14 and 15 are made in engagement by rotation in the untightening direction as shown in FIG. 12 in the condition that the outer cap is pushed down. Further, the engaging projection 15 serves also to be a projection for engaging the resilient engaging pieces 5 projected from the rear surface of the top wall 10 of the outer cap.

According to the six embodiment as shown in FIGS. 13a and 13b, an auxiliary spring 15 is interposed between the top walls 3 and 10 of the inner and outer caps in order to aid the resilient engaging pieces 5 as shown in the foregoing embodiments.

Said spring serves to push up the outer cap 9 auxiliarily, and has nothing to do with the transmission of turning force between the inner and outer caps.

The safety cap according to the present invention comprises an inner and outer double cap providing with a means for preventing from being opened by children between said caps so that when the outer cap is turned in an untightening direction in a conventional manner, the inner cap is not turned running idle, therefore children would give up to open the cap. The thread 8 is provided in the inner surface of the peripheral wall 4 of the inner cap so as to thread with the neck portion of the container, so that the top wall of the inner cap or packing seals the container by tightening the cap in the same manner as that of conventional thread type cap dispensing with a resilient cylindrical part as seen in the previous cap, thereby to secure sealing effect even when in resilient fatigue of the resilient cylindrical part. The resilient engaging pieces are projected with their untomost ends formed as free ends in the same diagonal direction from one opposite side of the top walls of the inner and outer caps to the other top walls, on which walls the projections are provided in engagement with the utmost ends of the said resilient engaging pieces only when the outer cap is turned in a tightening direction, thus enabling to perform, when necessary, the interlocking of both inner and outer caps and the rotation of the outer caps only, and thereby performing function as a safety cap, that is, the cap can not be disengaged by children but can easily be opened by adult.

Further, since size and number of resilient engaging pieces may be freely determined, the strength required for pushing down the outer cap at the time of removing the safety cap may optionally be determined, to thus increase the safety of the safety cap.

What is claimed is:

1. A safety cap comprising an inner cap of a synthetic material having at its peripheral wall inner surface a thread part adapted to be threaded into a neck part of container and an outer cap of a synthetic material having said inner cap mounted therein vertically and rotatably, in which a plurality of resilient engaging pieces are projected with their utmost ends formed as free ends in the same diagonal direction from one top wall to the other top wall of said caps, projections are provided on said other top wall so as to engage with the utmost ends of said resilient engaging pieces only when the outer cap is turned in a tightening direction, and engaging projections, which are able to transmit the turning force of outer cap to the inner cap only when the outer cap is moved downward against the resilience of said resilient engaging pieces, are provided on a part of outer surface of the inner cap and a part of inner surface of the outer cap, respectively.

2. A safety cap comprising an inner cap of a synthetic material having at its peripheral wall inner surface a thread part adapted to be threaded into a neck part of container and an outer cap of a synthetic material having said inner cap mounted therein vertically and rotatably, in which resilient engaging pieces are provided on the top wall peripheral part of said inner cap to be projected with their utmost ends formed as free ends in the same diagonal direction towards the top wall of the outer cap, a hole for taking out a metal mold is provided in the top wall of the inner cap below the said resilient engaging pieces, and further a packing is provided on the rear surface of the top wall of the inner cap to be able to block said hole, projections are provided on the inner surface of the top wall of the outer cap so as to engage with the utmost ends of the said resilient engaging pieces only when the outer cap is turned in a tightening direction, and engaging projections, which are able to transmit the turning force of outer cap to the inner cap only when the outer cap is moved downwards against the resilience of said resilient engaging pieces and turned in an untightening direction, are provided between said inner and outer caps.

3. A safety cap comprising an inner cap of a synthetic material having at its peripheral wall inner surface a thread part adapted to be threaded into a neck part of container and an outer cap of a synthetic material having said inner cap mounted therein vertically and rotatably, in which resilient engaging pieces are provided on the peripheral edge of top wall inner surface of the outer cap to be projected with their utmost ends formed as free ends in the same diagonal direction towards the top wall of inner cap, a hole for taking out a metal mold is provided in the top wall of the outer cap above said resilient engaging pieces, and further a top wall covering plate is provided on the outer surface of the top wall of the outer cap to block said hole, projections are provided on the upper surface of the top wall of the inner cap so as to engage with the utmost ends of the said resilient engaging pieces only when the outer cap is turned in a tightening direction, and engaging projections, which are able to transmit the turning force of outer cap to the inner cap only when the outer cap is moved downwards against the resilience of said resilient engaging pieces and turned in an untightening direction, are provided between said inner and outer caps.

* * * * *